(12) United States Patent
MacDougall et al.

(10) Patent No.: US 7,526,149 B1
(45) Date of Patent: Apr. 28, 2009

(54) DUAL WAVELENGTH STRAIN-TEMPERATURE BRILLOUIN SENSING SYSTEM AND METHOD

(75) Inventors: Trevor Wayne MacDougall, Simsbury, CT (US); Paul Eric Sanders, Madison, CT (US)

(73) Assignee: Qorex, LLC, Hartford, CT (US)

( * ) Notice: Subject to any disclaimer, the term of this patent is extended or adjusted under 35 U.S.C. 154(b) by 0 days.

(21) Appl. No.: 12/176,468

(22) Filed: Jul. 21, 2008

(51) Int. Cl.
*G02B 6/00* (2006.01)
*G01J 1/04* (2006.01)
*H04B 10/00* (2006.01)

(52) U.S. Cl. .......................... 385/12; 385/13; 385/122; 385/100; 385/123; 250/227.11; 250/227.14; 250/227.16; 250/227.18; 70/760; 70/766; 70/800; 398/108

(58) Field of Classification Search ................ 385/12, 385/13, 122, 100, 123; 70/760, 766, 800; 250/227.11, 227.14, 227.16, 227.18; 398/108
See application file for complete search history.

(56) References Cited

U.S. PATENT DOCUMENTS

| | | | |
|---|---|---|---|
| 6,380,534 B1 * | 4/2002 | Farhadiroushan et al. | 250/227.14 |
| 6,647,160 B1 * | 11/2003 | Chi et al. | 385/12 |
| 7,199,869 B2 * | 4/2007 | MacDougall | 356/73.1 |
| 7,355,163 B2 * | 4/2008 | Watley et al. | 250/227.14 |
| 2005/0094129 A1 * | 5/2005 | MacDougall | 356/73.01 |
| 2006/0285850 A1 * | 12/2006 | Colpitts et al. | 398/108 |
| 2008/0018903 A1 * | 1/2008 | Bao et al. | 356/477 |
| 2008/0193126 A1 * | 8/2008 | Yamamoto | 398/34 |

* cited by examiner

*Primary Examiner*—Brian M Healy
(74) *Attorney, Agent, or Firm*—McCormick, Paulding & Huber LLP

(57) ABSTRACT

An optical fiber strain-temperature sensing system includes first and second optical sources respectively generating first and second light signals having different wavelengths. Optical circulators direct the light signals to an external sensing cable for the respective generation of first and second Brillouin scattered light signals. First and second frequency mixers have a first input respectively coupled to the first and second optical light sources. The optical circulators direct the first and second Brillouin scattered light signals respectively to second inputs of the first and second frequency mixers. First and second transducers are respectively coupled to an output of the first and second frequency mixers and are respectively configured for generating first and second electrical signals indicative of a Brillouin frequency shift of the first and second light signals. A processor is coupled to the first and second transducers, and determines the strain and temperature characteristics of the external sensing cable.

15 Claims, 1 Drawing Sheet

DUAL WAVELENGTH STRAIN-TEMPERATURE BRILLOUIN SENSING SYSTEM AND METHOD

FIELD OF THE INVENTION

The present invention is directed generally to an optical fiber strain-temperature sensing system, and more particularly to a Brillouin optical time domain reflectometer for detecting the strain and temperature states of an optical fiber.

CROSS-REFERENCE TO RELATED APPLICATION

This application is related to U.S. application Ser. No. 12/099,346, pending filed on Apr. 8, 2008, entitled "Strain and Hydrogen Tolerant Optical Distributed Temperature Sensor System and Method", the disclosure of which is hereby incorporated by reference in its entirety.

BACKGROUND OF THE INVENTION

It is well known that Brillouin Optical Time Domain Reflectometers (BOTDR) are sensitive to both the strain and temperature state of the optical fiber being interrogated. Historically, the main challenge to these systems has been to separate the strain effects from the temperature effects in order to measure both quantities. The invention described here provides a system and method for discriminating the contribution of the signal change due to both of these quantities.

Previously used methods have included techniques which measured not only the shift in the Brillouin frequency but also the bandwidth of the gain spectrum. Also, attempts have been made to strain isolate the cable using mechanical design as well as installing a separate fiber to perform a differential measurement.

Optical distributed temperature sensors, commonly referred to as "DTS" systems, based on fiber optic sensing techniques are being used broadly in a number of applications and markets (for more information, see www.sensa.org). Optical DTS is predominantly based on nonlinear type optical sensors, in which high intensity pulsed laser energy is launched into a sensing fiber to stimulate nonlinear effects that cause light scattering. Optical DTS systems have been made using optical Raman effects, and other optical DTS systems have been made using optical Brillouin effects.

It is known that both Raman effects and Brillouin effects cause both Stokes anti-Stokes shifted signals propagating in both forward and backward directions in which their relative intensity and/or frequency is dependent on temperature. Raman effects and Brillouin effects are discussed in the paper, Daniele Inaudi and Branko Glisic, "Integration of distributed strain and temperature sensors in composite coiled tubing", 2006 SPIE Smart Structures and Materials Conference, San Diego, Calif., Feb. 27 to Mar. 2, 2006, (Authors from SMARTEC SA, Via Pobiette 11, CH-6928 Manno, Switzerland, www.smartec.ch), the disclosure of which is hereby incorporated by reference in its entirety. Using Optical Time Delay Reflectometry (OTDR), temperature at distinct positions all along the fiber can be derived so that the entire fiber is probed as a fully distributed temperature sensor.

Of the nonlinear DTS sensors, the use of Raman type far exceeds that of the Brillouin type because the Raman effect—being vibrational—is sensitive to temperature only, as compared to the Brillouin effect (acoustic) that is sensitive to both temperature and strain. Use of the latter for DTS therefore requires complete isolation of fiber strain or extraction of its strain error in the temperature measurement. Conversely, Brillouin systems are frequently used to monitor strain in known or controlled thermal environments.

Despite insensitivity to strain, there are drawbacks to Raman systems in that the intensity of backscattered Stokes/anti-Stokes signals are very weak, requiring a high sensitivity optical receiver and significant amount of signal averaging/processing because of the low received optical signal-to-noise ratio (OSNR). Furthermore, with the Raman shifted lines being widely separated in wavelength (e.g. over 200 nm for a 1550 nm operating system), the received intensity of these lines, and subsequent temperature measurement, can be significantly offset by changes in background fiber attenuation. This problem is commonly referred to as differential fiber attenuation (DFA) and is exacerbated when using telecommunications-grade graded index multimode fiber.

The above-mentioned multimode fiber is used predominantly in Raman systems because of its high level of index-modifying dopants such as $GeO_2$ to increase the nonlinear scatter intensity as well as being better to collect scattered light. Unfortunately, this fiber is quite sensitive to environmental effects such as chemical (hydrogen) and mechanical events acting on the fiber that cause DFA that can be of significant magnitude in the case of the former and random in the case of the latter. Furthermore, such multimode fibers have an inherent higher attenuation rate compared to single mode fibers and therefore are not well suited for long reach (e.g. power lines, subsea oil and gas pipelines). Raman systems can and do operate on single mode fibers that can benefit from the lower sensitivity to DFA by virtue of their single mode waveguiding and lower dopant level; however the intensity and light collection of Raman scattered signals is quite low with single mode fibers, relegating single mode Raman systems primarily in applications where single mode fiber is already in place (e.g. optical ground wires) or short reach applications.

Brillouin systems, on the other hand, operate exclusively on single mode optical fibers that are less sensitive to DFA by their single mode propagation (no differential modal attenuation) and lower dopant level. Furthermore, Brillouin systems are further insensitive to residual DFA as the separation between lines is much smaller—only fractions of nanometers—so that changes in background fiber attenuation tends to apply almost equally on the two lines. Brillouin DTS systems thus become attractive in a range of long reach and chemical environments if not for the strain cross-sensitivity inherent with Brillouin technology, leading to a number of proposed methods to eliminate or isolate strain acting on the fiber through mechanical design as well as through the installation of a separate fiber to perform a differential measurement. Such methods also include means to discriminate or separate temperature-modulated information from corresponding strain-modulated information.

These methods have included techniques which measure not only the shift in the Brillouin frequency but also the bandwidth of the gain spectrum. Among these methods, reference is made to Parker et al. "Temperature and strain dependence of the power level and frequency of spontaneous Brillouin scattering in optical fibres", Optics Letters, June 2007 Vol. 22, No. 11, pp. 787-789 and Parker et al. "Simultaneous Distributed Measurement of Strain and Temperature from Noise-initiated Brillouin Scattering in Optical Fibres", IEEE JQE, April 1998, Vol. 34, No. 4, pp 645-659.

In addition to monitoring the amplitude and bandwidth of the frequency shifted signal, solutions using multi-layered fibers or dispersion shifted fibers which generate multiple peak return signals have also been investigated. See "Spontaneous and Stimulated Brillouin Scattering Gain Spectra in Optical Fibers", Yeniay, Aydin et al. Journal of Lightwave Technology, VOL. 20, NO. 8, August 2002. Both of these approaches suffer from a multitude of practical issues including poor contrast of the various peak shifts relative to one another as well as poor sensitivity of the amplitude and bandwidth to differing strain and temperature. These practical issues have limited the realization of such systems.

In view of the foregoing, there is an ongoing need for a strain-temperature sensing system which is configured to provide independent information about the strain and temperature states of an optical fiber.

SUMMARY OF THE INVENTION

In a first aspect of the present invention, an optical fiber strain-temperature sensing system includes a first optical source configured for generating a first light signal having a first wavelength. A second optical source is configured for generating a second light signal having a second wavelength different from the first wavelength. A plurality of optical routing elements, such as optical circulators are configured for directing the first and second light signals to an external sensing cable for the respective generation of first and second Brillouin scattered light signals. A first frequency mixer has a first input coupled to the first optical light source, and a second frequency mixer has a first input coupled to the second optical light source. The optical routing elements are also configured for directing the first and second Brillouin scattered light signals returning from an external sensing cable respectively to second inputs of the first and second frequency mixers. A first transducer is coupled to an output of the first frequency mixer and is configured for generating a first electrical signal indicative of a Brillouin frequency shift of the first light signal. A second transducer is coupled to an output of the second frequency mixer and is configured for generating a second electrical signal indicative of a Brillouin frequency shift of the second light signal. A processor is coupled to the first and second transducers, and is configured for determining the strain and temperature characteristics of an external sensing cable based on the Brillouin frequency shifts of the first and second light signals.

In a second aspect of the present invention, a method of determining strain and temperature states of an optical fiber includes injecting a first light signal having a first wavelength into an optical fiber configured for generating therefrom a first Brillouin scattered return light signal. A second light signal having a second wavelength different from the first wavelength is injected into the optical fiber configured for generating therefrom a second Brillouin scattered return light signal. The first light signal is mixed with the first Brillouin scattered return light signal to form a first mixed light signal. The second light signal is mixed with the second Brillouin scattered return light signal to form a second mixed light signal. The first mixed light signal is converted into a first electrical signal indicative of a Brillouin frequency shift of the first light signal. Likewise, the second mixed light signal is converted into a second electrical signal indicative of a Brillouin frequency shift of the second light signal. The first and second electrical signals are analyzed to determine the strain and temperature characteristics of the optical fiber.

DETAILED DESCRIPTION OF THE PREFERRED EMBODIMENTS

Figure 1:
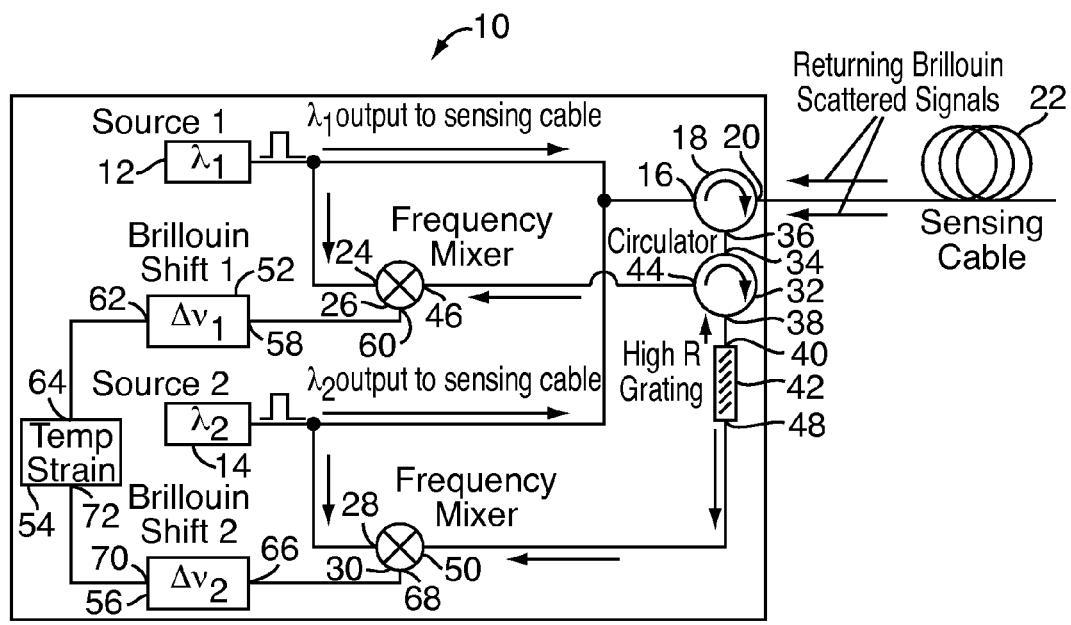
FIG. 1 schematically illustrates an optical fiber strain-temperature sensing system in accordance with the present invention.

An optical fiber strain-temperature sensing system in accordance with the present invention is indicated generally by the reference number 10. The sensing system 10 includes a first optical source 12 and a second optical source 14. The first and second optical sources 12, 14 are each coupled to a first port 16 of a first optical routing element such as, for example, a first optical circulator 18. A second port 20 of the first optical circulator 18 is to be coupled to an optical fiber or sensing cable 22 such as, for example, an SMF-28 type optical fiber whose strain and temperature characteristics are to be determined using Brillouin frequency shifting analysis. The first optical source 12 is also coupled to a first input 24 of a first frequency mixer 26. Similarly, the second optical source 14 is also coupled to a first input 28 of a second frequency mixer 30.

A second optical routing element such as, for example, a second optical circulator 32 has a first port 34 coupled to a third port 36 of the first optical circulator 18. A second port 38 of the second optical circulator 32 is coupled to a first end 40 of an optical filter such as, for example, a high reflectivity filter 42. A third port 44 of the second optical circulator 32 is coupled to a second input 46 of the first frequency mixer 26. A second end 48 of the high reflectivity filter 42 is coupled to a second input 50 of the second frequency mixer 30.

A transducer such as, for example, a first fast photodetector 52 is interposed between the first frequency mixer 26 and a processor 54 configured for analyzing the strain and temperature characteristics of the optical fiber 22. Likewise, another transducer such as a second fast photodetector 56 is interposed between the second frequency mixer 30 and the processor 54. More specifically, an input 58 of the first fast photodetector 52 is coupled to an output 60 of the first frequency mixer 26, and an output 62 of the first fast photodetector 52 is coupled to a first input 64 of the processor 54. Similarly, an input 66 of the second fast photodetector 56 is coupled to an output 68 of the second frequency mixer 30, and an output 70 of the second fast photodetector 56 is coupled to a second input 72 of the processor 54.

The first and second optical sources 12, 14 are preferably lasers, and more specifically can be off the shelf distributed feedback (DFB) lasers with line widths of <2 MHz such as those available from Furakawa (Series FOLDCW-x). These lasers are configured to be pulsed to provide the OTDR functionality and then injected into the optical fiber or sensing cable being measured. The first and second optical sources 12, 14 are configured to generate pulsed light signals having wavelengths different relative to each other for reasons to be explained below. For example, the first optical source 12 can be implemented to generate a pulsed light signal having a wavelength of about 1300 nm, and the second optical source 14 can be implemented to generate a pulsed light signal having a wavelength of about 1550 nm.

The first and second optical circulators 18, 32 can be, for example, those available from Alliance Fiber Optic Products. The first and second frequency mixers 26, 30 can be, for example, 3 dB fiber optic couplers available from Fiber Instrument Sales. The high reflectivity filter 42 can be, for example, a 200 GHz WDM filter manufactured by Bookham, Inc. The first and second optical circulators 18, 32 and 3 dB fiber optic couplers are used to direct the light from the optical sources 12, 14 into the sensing cable 22 and from the sensing cable into the interrogator and frequency mixers 26, 30. A portion of the output signals of the optical sources 12, 14 each is respectively routed to the first and second frequency mixers 26, 30 so as to mix with the Brillouin scattered return light signals coming back from the sensing cable 22. This mixing is preferably performed using 3 dB fiber optic couplers to combine the two optical signals and respectively project them together onto the first and second fast photodetectors 52, 56 such as available from Ortel/Emcore series 2500. This process creates an electrical signal whose frequency characteristics contain the induced Brillouin frequency shifts. This frequency shift ($\Delta v$) is proportional to the temperature and strain state of the sensing cable 22. By determining the induced frequency shift for both wavelengths and implementing additional processing as described above, both the strain and temperature of the sensing cable 22 portion under interrogation can be independently determined.

The solution proposed by the present invention and embodied in the sensing system 10 is to employ a dual wavelength interrogator to perform the BOTDR function. As noted in the TABLE below the scale factors at the wavelengths of 1300 nm and 1550 nm are different. More importantly, the ratio between the strain scale factor and that of temperature are different. This creates a system by which the use of two wavelengths provides linearly independent information about the strain and temperature states of the sensing cable 22. Sample scale factors are provided below in the TABLE and illustrated graphically in FIGS. 2 and 3.

TABLE

| Item | 1.3 μm band | 1.55 μm band |
|---|---|---|
| Temp. (dvB/dT) | 1.22 MHz/° C. | 1 MHz/° C. |
| Strain (dvB/dε) | 581 MHz/% | 493 MHz/% | where:
vB is the Brillouin frequency shift;
a. T is temperature; and
b. ε c is strain.

Figure 2:
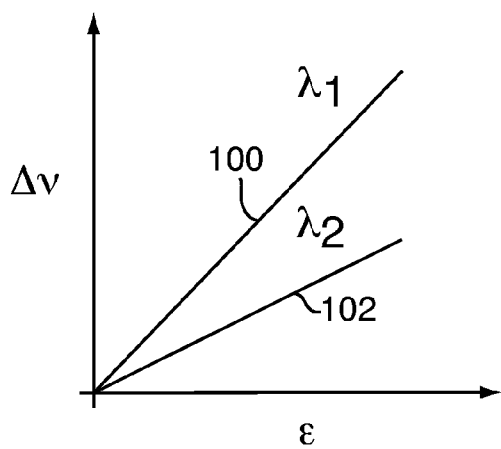
FIG. 2 is a graph illustrating the Brillouin frequency shift as a function of strain on an optical fiber for two optical wavelengths

FIG. 2 graphically illustrates plots showing Brillouin frequency shift ($\Delta v$) versus strain ($\epsilon$) for the 1300 nm and 1550 nm wavelength bands. More specifically, a linear plot 100 shows the Brillouin frequency shift versus strain for the 1300 nm wavelength band. Likewise, a linear plot 102 shows the Brillouin frequency shift versus strain for the 1550 nm wavelength band.

Figure 3:
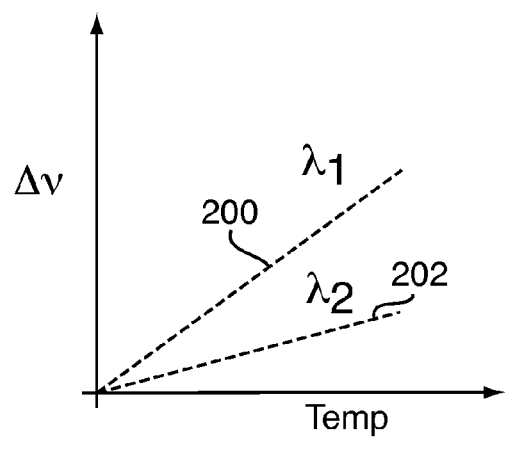
FIG. 3 is a graph illustrating the Brillouin frequency shift as a function of temperature on an optical fiber for two optical wavelengths

FIG. 3 graphically illustrates plots showing Brillouin frequency shift ($\Delta v$) versus temperature for the 1300 nm and 1550 nm wavelength bands. More specifically, a linear plot 200 shows the Brillouin frequency shift versus temperature for the 1300 nm wavelength band. Likewise, a linear plot 202 shows the Brillouin frequency shift versus temperature for the 1550 nm wavelength band.

By monitoring at these two wavelengths a BOTDR based sensor can be constructed which provides information about the temperature and strain of the optical fiber or sensing cable 22.

The system of linear equations shown below details the solution by which the processor 54 is configured to determine the strain and temperature state of the fiber.

$$\begin{bmatrix} \Delta T \\ \Delta \varepsilon \end{bmatrix} = \begin{bmatrix} \frac{d}{dT} vB1300 & \frac{d}{d\varepsilon} vB1300 \\ \frac{d}{dT} vB1550 & \frac{d}{d\varepsilon} vB1550 \end{bmatrix}^{(-1)} \begin{bmatrix} \Delta vB1300 \\ \Delta vB1550 \end{bmatrix}$$

When the scale factors for both wavelengths are known and the total frequency shift at each wavelength is measured by the processor 54, the strain and temperature states can then be independently determined.

In sum, this solution uses a two wavelength system to discriminate between the temperature and strain states of an optical fiber or sensing cable. The use of two wavelengths enables the measurement of both strain and temperature with very high contrast. The scale factors of the optical signals with this approach provide a much more accurate and reliable determination of the strain and temperature states of an optical fiber especially when compared to methods involving monitoring of multiple peak signals as generated by dispersion shifted type fibers and monitoring the bandwidth and amplitude of reflected frequency shifted signals.

Although the invention has been described and illustrated with respect to exemplary embodiments thereof, the foregoing and various other additions and omissions may be made therein and thereto without departing from the spirit and scope of the present invention.

What is claimed is:

1. An optical fiber strain-temperature sensing system comprising:
    a first optical source configured for generating a first light signal having a first wavelength;
    a second optical source configured for generating a second light signal having a second wavelength different from the first wavelength;
    a plurality of optical routing elements configured for directing the first and second light signals to an external sensing cable for the respective generation of first and second Brillouin scattered light signals;
    a first frequency mixer having a first input coupled to the first optical light source;
    a second frequency mixer having a first input coupled to the second optical light source;
    the optical routing elements also being configured for directing the first and second Brillouin scattered light signals returning from an external sensing cable respectively to second inputs of the first and second frequency mixers;
    a first transducer coupled to an output of the first frequency mixer and configured for generating a first electrical signal indicative of a Brillouin frequency shift of the first light signal;
    a second transducer coupled to an output of the second frequency mixer and configured for generating a second electrical signal indicative of a Brillouin frequency shift of the second light signal; and
    a processor coupled to the first and second transducers, the processor being configured for determining the strain and temperature characteristics of an external sensing cable based on the Brillouin frequency shifts of the first and second light signals.

2. A system as defined in claim 1, wherein the plurality of optical routing elements include:
   a first optical routing element having first, second and third ports;
   a second optical routing element having first, second and third ports; and
   an optical filter having a first end and a second end;
   the first port of the first optical routing element being coupled to the first and second optical sources, and the second port of the first optical routing element to be coupled to an external sensing cable;
   the first port of the second optical routing element being coupled to the third port of the first optical routing element, and the third port of the second optical routing element being coupled to the second input of the first frequency mixer; and
   the first end of the optical filter being coupled to the second port of the second optical routing element, and the second end of the optical filter being coupled to the second input of the second frequency mixer.

3. A system as defined in claim 1, wherein the first and second frequency mixers each include 3 dB fiber optic couplers.

4. A system as defined in claim 1, wherein the first and second optical sources each include distributed feedback lasers.

5. A system as defined in claim 4, wherein the distributed feedback lasers each have line widths less than about 2 MHz.

6. A system as defined in claim 1, wherein the first and second transducers each include fast photodetectors.

7. A system as defined in claim 1, wherein one of the first and second optical sources is configured for generating a light signal having a wavelength of about 1300 nm, and the other one of the first and second optical sources is configured for generating a light signal having a wavelength of about 1550 nm.

8. A system as defined in claim 1, wherein the processor is configured for analyzing the first and second Brillouin scattered light signals to determine the strain and temperature characteristics of an external sensing cable.

9. A system as defined in claim 1, wherein the processor is configured for analyzing the first and second Brillouin scattered light signals to determine the strain and temperature characteristics of an external sensing cable in accordance with the following linear equations:

$$\begin{bmatrix} \Delta T \\ \Delta \varepsilon \end{bmatrix} = \begin{bmatrix} \frac{d}{dT} vBwav1 & \frac{d}{d\varepsilon} vBwav1 \\ \frac{d}{dT} vBwav2 & \frac{d}{d\varepsilon} vBwav2 \end{bmatrix}^{(-1)} \begin{bmatrix} \Delta vBwav1 \\ \Delta vBwav2 \end{bmatrix}$$

where vB is the Brillouin frequency shift;
   T is temperature;
   $\varepsilon$ is strain;
   wav1 is the wavelength of a light signal from one of the first and second optical sources; and
   wav2 is the wavelength of a light signal from the other of the first and second optical sources.

10. A system as defined in claim 1, wherein the processor is configured for analyzing the first and second Brillouin scattered light signals to determine the strain and temperature characteristics of an external sensing cable in accordance with the following linear equations:

$$\begin{bmatrix} \Delta T \\ \Delta \varepsilon \end{bmatrix} = \begin{bmatrix} \frac{d}{dT} vB1300 & \frac{d}{d\varepsilon} vB1300 \\ \frac{d}{dT} vB1550 & \frac{d}{d\varepsilon} vB1550 \end{bmatrix}^{(-1)} \begin{bmatrix} \Delta vB1300 \\ \Delta vB1550 \end{bmatrix}$$

where vB is the Brillouin frequency shift;
   T is temperature;
   $\varepsilon$ is strain;
   1300 generally is the wavelength in nm of a light signal from one of the first and second optical sources; and
   1550 generally is the wavelength in nm of a light signal from the other of the first and second optical sources.

11. A system as defined in claim 1, further comprising an optical fiber serving as a sensing cable communicating with the optical routing elements, the optical fiber being configured for receiving the first and second light signals, and being configured for generating the first and second Brillouin scattered light signals.

12. A system as defined in claim 11, wherein the optical fiber is an SMF-28 type optical fiber.

13. A method of determining strain and temperature states of an optical fiber comprising the steps of:
   injecting a first light signal having a first wavelength into an optical fiber configured for generating therefrom a first Brillouin scattered return light signal;
   injecting a second light signal having a second wavelength different from the first wavelength into the optical fiber configured for generating therefrom a second Brillouin scattered return light signal;
   mixing the first light signal with the first Brillouin scattered return light signal to form a first mixed light signal;
   mixing the second light signal with the second Brillouin scattered return light signal to form a second mixed light signal;
   converting the first mixed light signal into a first electrical signal indicative of a Brillouin frequency shift of the first light signal;
   converting the second mixed light signal into a second electrical signal indicative of a Brillouin frequency shift of the second light signal; and
   analyzing the first and second electrical signals to determine the strain and temperature characteristics of the optical fiber.

14. A method as defined in claim 13, wherein the step of analyzing is performed according to the following system of linear equations:

$$\begin{bmatrix} \Delta T \\ \Delta \varepsilon \end{bmatrix} = \begin{bmatrix} \frac{d}{dT} vBwav1 & \frac{d}{d\varepsilon} vBwav1 \\ \frac{d}{dT} vBwav2 & \frac{d}{d\varepsilon} vBwav2 \end{bmatrix}^{(-1)} \begin{bmatrix} \Delta vBwav1 \\ \Delta vBwav2 \end{bmatrix}$$

where vB is the Brillouin frequency shift between a light signal and a corresponding Brillouin scattered return light signal;
   T is temperature of the optical fiber;
   $\varepsilon$ is strain of the optical fiber;
   wav1 is the wavelength of one of the first and second light signals; and
   wav2 is the wavelength of the other of the first and second light signals.

15. A method as defined in claim 13, wherein the step of analyzing is performed according to the following system of linear equations:

$$\begin{bmatrix} \Delta T \\ \Delta \varepsilon \end{bmatrix} = \begin{bmatrix} \frac{d}{dT} vB1300 & \frac{d}{d\varepsilon} vB1300 \\ \frac{d}{dT} vB1550 & \frac{d}{d\varepsilon} vB1550 \end{bmatrix}^{(-1)} \begin{bmatrix} \Delta vB1300 \\ \Delta vB1550 \end{bmatrix}$$

where vB is the Brillouin frequency shift between a light signal and a corresponding Brillouin scattered return light signal;

T is temperature of the optical fiber;

$\epsilon$ is strain of the optical fiber;

1300 generally is the wavelength in nm of one of the first and second light signals; and 1550 generally is the wavelength in nm of the other of the first and second light signals.

\* \* \* \* \*